Nov. 20, 1956  K. A. G. GUSTAVSSON  2,771,157
METHOD OF CONVERTING KINETIC ENERGY TO PRESSURE ENERGY
AND A DEVICE FOR CARRYING OUT THE METHOD
Filed May 26, 1953  4 Sheets-Sheet 1
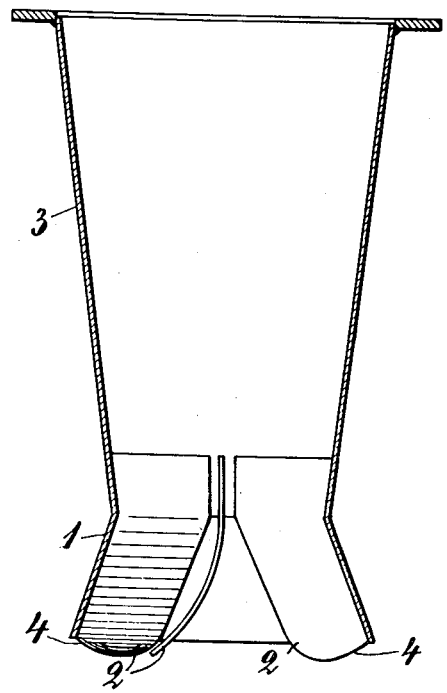
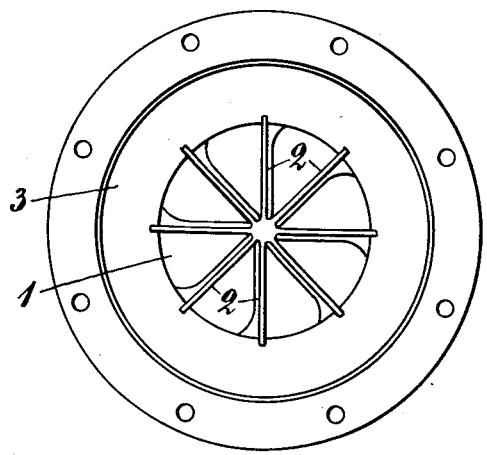
INVENTOR
KARL AXEL GÖRAN GUSTAVSSON
BY
ATTORNEY Nov. 20, 1956  K. A. G. GUSTAVSSON  2,771,157
METHOD OF CONVERTING KINETIC ENERGY TO PRESSURE ENERGY
AND A DEVICE FOR CARRYING OUT THE METHOD
Filed May 26, 1953  4 Sheets-Sheet 2

INVENTOR
KARL AXEL GÖRAN GUSTAVSSON
BY
ATTORNEY

INVENTOR
KARL AXEL GÖRAN GUSTAVSSON

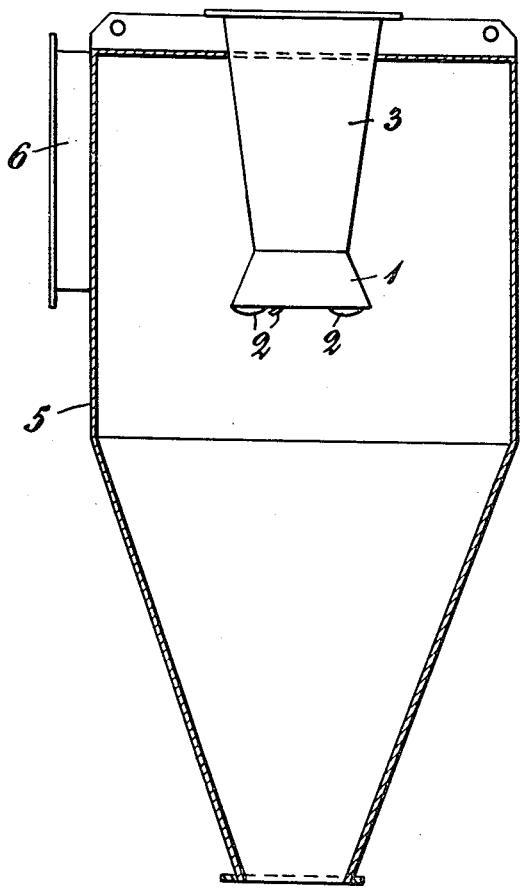

United States Patent Office 2,771,157
Patented Nov. 20, 1956

2,771,157

METHOD OF CONVERTING KINETIC ENERGY TO PRESSURE ENERGY AND A DEVICE FOR CARRYING OUT THE METHOD

Karl Axel Göran Gustavsson, Enkoping, Sweden, assignor to Aktiebolaget B. A. Hjorth & Co., Stockholm, Sweden, a corporation of Sweden Application May 26, 1953, Serial No. 357,491

Claims priority, application Sweden July 11, 1952

4 Claims. (Cl. 183—83)

The present invention relates to means for converting kinetic energy into pressure energy, more particularly to means for converting kinetic energy into pressure energy present in a whirl formed by a fluid flowing toward a central outlet orifice due to a difference in pressure and having a tangential component of movement. Such conditions of flow occur, for instance, in a cyclone. Accordingly, novel and improved deflection and guide means for use in cyclones, more specifically in the outlet duct thereof, constitutes a now preferred field of application of the invention.

In a fluid whirl, as herein referred to, the flowing fluid experiences an acceleration of the flow velocity. In an ideal fluid flow, that is in a frictionless flow, the flow spiral follows the equation $$v_{t_r} = v_{t_R} \cdot \frac{R}{r} \qquad (1)$$

wherein $v_{t_R}$ is the tangential component of movement at an outer radius R, and $v_{t_r}$ is the tangential component of movement at an inner radius r, radii R and r being the minimum distances from the center C of the discharge orifice.

The flow line, according to this equation, is a logarithmic spiral and the increase of the tangential component of movement with increasing radius is a hyperbola with the asymptote for $R=0$.

Due to the internal friction that is present within an actual flow of fluid, the fluid flow cannot follow the ideal Equation 1.

According to several experimental data published in the literature, the tangential velocity increases at a greater distance from the center of the whirl inversely proportional to the root of the radius, that is, $$v_{t_r} = v_{t_R} \cdot \sqrt{\frac{R}{r}} \qquad (2)$$

It decreases in the vicinity of the center.

In or near the center of the spiral flow, the forces of friction are generally so high that the fluid, such as air, rotates in the manner of an axle rotating with constant angular velocity, that is, it follows the equation $$v_{t_r} = v_{t_R} \cdot \frac{r}{R} \qquad (3)$$

The acual line of flow is approximately an Archimedean screw.

According to this invention, the kinetic energy of fluid flowing in a whirl, as hereinbefore referred to, is converted into pressure energy by deflecting the direction of movement of the flowing fluid approximately vertical to the plane of the fluid whirl without conversion of the kinetic energy of the fluid flow into pressure energy, and the kinetic energy of the fluid flow is subsequently converted into pressure energy by being subjected to a decrease in velocity in a diffuser.

I have found that the best possible results are obtained by deflecting the fluid flow without changing its velocity of movement. However, favorable results can also be obtained when the deflection of the fluid flow is coupled with a change in the velocity of the movement. In case the velocity is reduced, such reduction should not be more than one-half of the initial velocity and, in case the velocity is increased, such increase should not exceed twice the initial velocity.

For the purpose of obtaining the aforesaid deflection of the fluid flow, novel and improved deflection blades, the configuration of which will be more fully explained hereinafter, are disposed within a discharge duct into which is directed an inwardly spiralling flow of fluid. These blades are arranged to deflect the fluid flow approximately vertical to the plane of the whirl formed by it. A diffuser communicating with the outlet side of the discharge duct then converts the kinetic energy of the deflected fluid fllow into pressure energy.

Other objects, features and advantages of the invention will be pointed out hereinafter and set forth in the appended claims forming part of the application.

In the accompanying drawing a now preferred embodiment of the invention is shown by way of illustration and not by way of limitation.

In the drawing:

Fig. 1 is a longitudinal section of a discharge duct and deflection blades fitted therein according to the invention.

Fig. 2 is a bottom view of Fig. 1.

Fig. 7 is a diagrammatic sectional view of a cyclone equipped with a duct according to Fig. 1.

Figure 3:
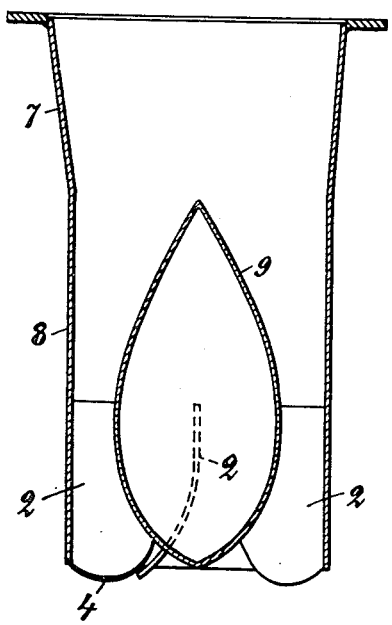
Fig. 3 is a sectional view similar to Fig. 1 showing a modification of the discharge duct and the deflection blades disposed therein.

Referring now to the figures in detail, Fig. 7 shows a cyclone 5 of conventional design with a tangentially disposed inlet duct 6. The cyclone also comprises a centrally disposed outlet duct. The duct is in form of two frusto-conical portions 3 and 1 joined at their narrow ends. The upper portion 3 constitutes a diffuser portion and the lower portion 1 a throat portion.

In this connection it should be mentioned that while the deflection and guide means according to the invention are shown in connection with the discharge duct of a cyclone, said means are also useful for other fields of application.

According to Figs. 1 and 2, a plurality of blades 2, eight being shown, are mounted in the mouth portion of the throat portion 1.

To attain the desired result, it is essential that a fluid flow directed by inlet 6 toward and into the discharge duct in the form of an inwardly spiralling whirl with a tangential and radial component of movement is deflected approximately at a right angle to a plane of the whirl without experiencing an appreciable change in velocity. The angle of impingement of the flow upon the blades is preferably kept 0 or approximately 0 at each point of the leading edge 4 of the blades by making the angle of impingement of the flow upon the blades corresponding to the tangential component of the spiral flow.

The aforesaid results are accomplished by a blade configuration such that the blades are in the form of generally plane surfaces curved in one plane only and that the leading edges of the blades are curved. The configuration of the duct section within which the deflection blades are disposed is such that the cross-sectional area of the channels formed by the adjacent blades is approximately uniform along the curved sections of the channels.

According to Figs. 1 and 2, the wall of the throat portion 1 follows closely the outer edges of the curved blades, but channels of approximately uniform cross-sectional area can also be formed by other spatial relationships of the blades and the respective duct wall, as will appear from the subsequent description.

The curvature of the blades can be defined as a continuous curve beginning with an inlet angle ($\alpha_1$, $\alpha_2$, $\alpha_3$, in Fig. 5) relative to the horizontal plane the tangent of which angle is $$\frac{v_{ax}}{v_t} \pm 25 \text{ percent} \quad (4)$$

and ending with an axial direction of ± 20 percent, wherein $v_{ax}$ is the axial average velocity in the inlet opening of the central duct, and $v_t$ is the maximum tangential velocity of the whirl.

The curvature of the leading edges can be defined as a continuous convex curve as seen in the direction of the fluid flow. The apex of said curve is fitted between one-fourth and the full radius of the inlet mouth of the throat portion. Near the center of said inlet mouth the curve changes to an axial or approximately axial direction so that the inclination of the blades in reference to the horizontal plane of said inlet mouth approaches 90°, when the radial distance from the center axis of the inlet mouth approaches the value of 0.

As previously mentioned, the fluid flow may be deflected without a change in velocity or with an increase or decrease in velocity. The aforesaid different operational conditions are obtained by designing the smallest cross-sectional area of the throat portion in accordance with the following equations:

Smallest area $=F_i \times \text{tg } \alpha$ _____ No change in velocity.
Smallest area $<F_i \times \text{tg } \alpha$ _____ Increase in velocity.
Smallest area $>F_i \times \text{tg } \alpha$ _____ Decrease in velocity.

wherein $F_i$ is the cross-sectional area of the throat portion at the inlet mouth thereof, and $\alpha$ is the inclination with reference to the horizontal plane of the inlet mouth of the throat portion.

Fig. 3 shows a discharge duct having an inwardly conical part 7 and a substantially cylindrical part 8. The deflection blades 2 are circumferentially spaced about a generally drop-shaped body 9 mounted near the inlet end of the duct coaxially therewith. The said body and the said blades are arranged in a spatial relationship such as to form channels of substantially uniform cross-sectional areas between each two adjacent blades.

Figure 4:
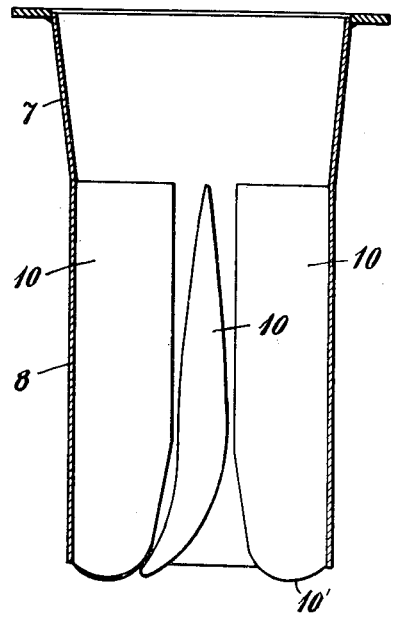
Fig. 4 is a sectional view of another modification of the discharge duct according to the invention and the blades therein.

According to Fig. 4 the aforesaid channels of substantially uniform cross-sectional areas are formed in a duct similar to the duct of Fig. 3 by providing blades 10 curved in one plane only as are the blades 2, but in contrast to the latter blades, having a curved mid-section of increased thickness. The leading edge 10' of blades 10 is similarly curved to the leading edge 4 of blades 2.

As previously explained, the velocity of the fluid flow is maintained constant when the deflected fluid flow is guided through channels of substantially uniform cross-sectional area, even though these channels may be of different shape.

Figure 5:
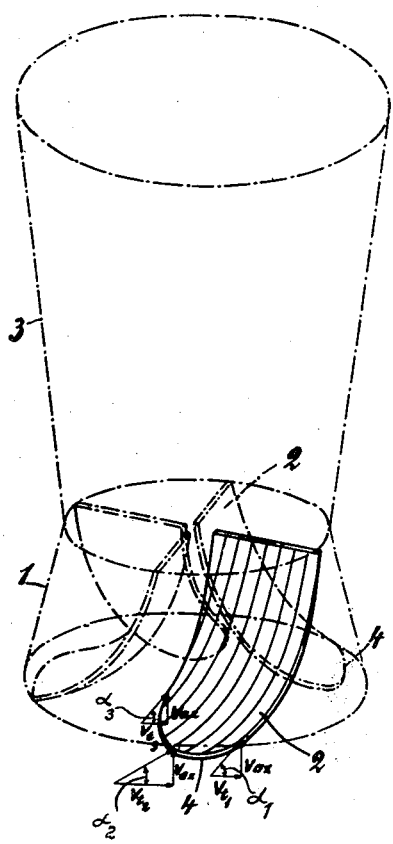
Fig. 5 is a perspective view of the deflection blades of Fig. 1.
Figure 6:
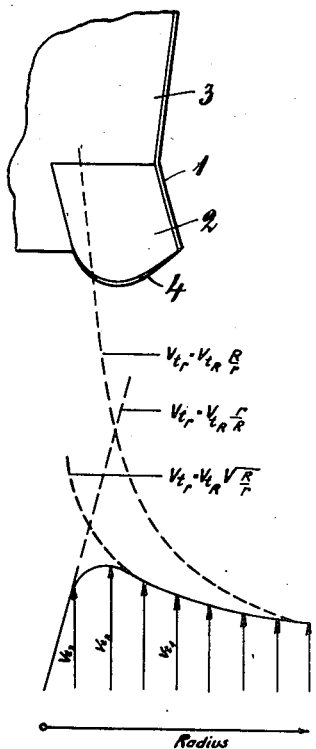
Fig. 6 is a graph showing the actual and ideal flow conditions.

Fig. 5 which shows four blades 2, in a duct similar to the duct of Figs. 1 and 2, illustrates that the curved leading edge 4 and the part of the blades near the inlet mouth of the throat portion 1 of the duct are shaped in conformity with the actual conditions of the fluid flow. These conditions are shown in Fig. 6 as curves identified by respective legends. The curves illustrate the tangential velocity components of the rotational fluid flow as a function of the variable radius $r$. In the formulas R is the greater radius and $r$ is the smaller radius $v_{t_R}$ and $v_{t_r}$ are the corresponding tangential velocities. Fig. 6 further shows the curves of an ideal fluid flow.

The vector diagrams in Fig. 5 and the equations in Fig. 6 correspond to the equations stated and explained in the previous description.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In a device for converting kinetic energy present in a whirl formed by an inwardly spiralling fluid flow into pressure energy, in which said whirl is formed in a housing including a chamber, said device comprising a discharge duct for the fluid centrally disposed within said chamber and said whirl, said discharge duct including a throat portion at the inlet end thereof and a diffuser portion at the outlet end thereof a plurality of deflection blades curved in one plane and mounted in said discharge duct in circumferential spacing, the leading edge of said blades forming a convex curve in the direction of the fluid flow and having an inlet angle conforming to the axial and tangential resultant of the fluid flow along the entire radius of rotation within the whirl whereby the blades deflect fluid spiralling into said duct approximately perpendicular to the general plane of said fluid whirl and the angle of impingement of the fluid flow upon the blades is about 0 at each point of the leading edge of the blades, said blades and said throat being disposed in a spatial relationship such as to form channels between adjacent blades having a cross-sectional area remaining substantially uniform perpendicular to the middle line of the curvature of said channels along the entire deflecting part of said blades, said diffuser portion communicating with the outlet side of said throat for reducing the velocity of the fluid flow thereby converting the kinetic energy of the fluid flow into pressure energy after the deflection of the fluid flow.

2. A device according to claim 1, wherein said diffuser portion and said throat portion are of frusto-conical form and are joined at their respective narrow ends and the smallest cross-sectional area of the said throat portion equals $F_i \cdot \text{tg } \alpha$, $F_i$ being the cross-sectional area of the throat portion at the inlet mouth thereof and $\alpha$ the inclination of the blades in reference to the horizontal plane of the inlet mouth of the throat portion whereby the said fluid flow is deflected without change in velocity.

3. A device according to claim 1, wherein said diffuser portion and said throat portion are of frusto-conical form and are joined at their respective narrow ends and the smallest cross-sectional area of said throat portion is greater than $F_i \cdot \text{tg } \alpha$, being the cross-sectional area of the throat portion at the inlet mouth thereof and $\alpha$ the inclination on the bladen in reference to the horizontal plane of the inlet mouth of the throat portion whereby the said fluid flow is deflected with an increased in velocity.

4. A device according to claim 1, wherein said diffuser portion and said throat portion are of frusto-conical form and are joined at their respective narrow ends and the smallest cross-sectional area of said throat portion is smaller than $F_i \cdot \text{tg } \alpha$, $F_i$ being the cross-sectional area of the throat portion at the inlet mouth thereof and $\alpha$ the inclination of the blades in reference to the horizontal plane of the inlet mouth of the throat portion whereby the said fluid flow is deflected with a decrease in velocity.

(References on following page)

References Cited in the file of this patent

UNITED STATES PATENTS

| | | |
|---|---|---|
| 1,766,237 | Whitmore | June 24, 1930 |
| 2,322,414 | Bowen | June 22, 1943 |
| 2,487,633 | Breslove | Nov. 8, 1949 |
| 2,506,298 | Griffin | May 2, 1950 |

FOREIGN PATENTS

| | | |
|---|---|---|
| 260,776 | Great Britain | Nov. 11, 1926 |
| 273,475 | Great Britain | July 7, 1927 |
| 406,036 | Great Britain | Feb. 19, 1934 |